(12) United States Patent
Morita et al.

(10) Patent No.: US 9,116,417 B2
(45) Date of Patent: Aug. 25, 2015

(54) IMAGING APPARATUS, LENS APPARATUS, AND IMAGING APPARATUS CONTROL METHOD

(71) Applicant: CANON KABUSHIKI KAISHA, Tokyo (JP)

(72) Inventors: Takuro Morita, Tokyo (JP); Hideya Takanashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/904,720

(22) Filed: May 29, 2013

(65) Prior Publication Data

US 2013/0330068 A1    Dec. 12, 2013

(30) Foreign Application Priority Data

Jun. 7, 2012 (JP) ................................. 2012-129960

(51) Int. Cl.
*G03B 17/00* (2006.01)
*G03B 17/14* (2006.01)
*H04N 5/232* (2006.01)

(52) U.S. Cl.
CPC ............ *G03B 17/14* (2013.01); *H04N 5/23209* (2013.01); *H04N 5/23245* (2013.01); *H04N 5/23212* (2013.01)

(58) Field of Classification Search
CPC ...................................................... G03B 17/14
USPC ........................................................ 396/529
See application file for complete search history.

(56) References Cited

U.S. PATENT DOCUMENTS

2009/0256950 A1* 10/2009 Kawazoe et al. ............. 348/345
2011/0044682 A1*  2/2011 Kawanami .................... 396/439

(Continued)

FOREIGN PATENT DOCUMENTS

JP      09-284632 A     10/1997
JP    2010-511871 A      4/2010

(Continued)

OTHER PUBLICATIONS

European Search Report issued on Jun. 6, 2014, that issued in the corresponding European Patent Application No. EP 13 16 8652.

*Primary Examiner* — Clayton E Laballe
*Assistant Examiner* — Dennis Hancock
(74) *Attorney, Agent, or Firm* — Cowan, Liebowitz & Latman, P.C.

(57) ABSTRACT

In a camera system having an interchangeable lens and a camera body, a lens controller and a camera controller conduct timely change between a first communication method for a video shooting mode and a second communication method for a still-image shooting mode, and reciprocally communicated via a contact unit. The camera controller acquires time information in advance by an initial communication with the lens controller, and upon changeover from the first communication method to the second communication method, it interrupts communication after request information for changeover of the communication methods is transmitted to the lens controller, and initiates communication in the second communication method after elapse of a transition time indicated by time information. Upon changeover from the second communication method to the first communication method, the camera controller initiates communication in the first communication method after elapse of a transition time indicated by the time information.

20 Claims, 9 Drawing Sheets

(56) References Cited

U.S. PATENT DOCUMENTS

| | | |
|---|---|---|
| 2011/0080488 A1 | 4/2011 | Okamoto et al. |
| 2012/0033955 A1* | 2/2012 | Okada ............................ 396/71 |
| 2012/0155853 A1* | 6/2012 | Osawa .......................... 396/529 |
| 2012/0219281 A1* | 8/2012 | Imafuji et al. ................ 396/529 |

FOREIGN PATENT DOCUMENTS

| | | |
|---|---|---|
| WO | 2008-070437 A | 6/2008 |
| WO | 2009/139118 A | 11/2009 |
| WO | 2009/139173 A | 11/2009 |

* cited by examiner

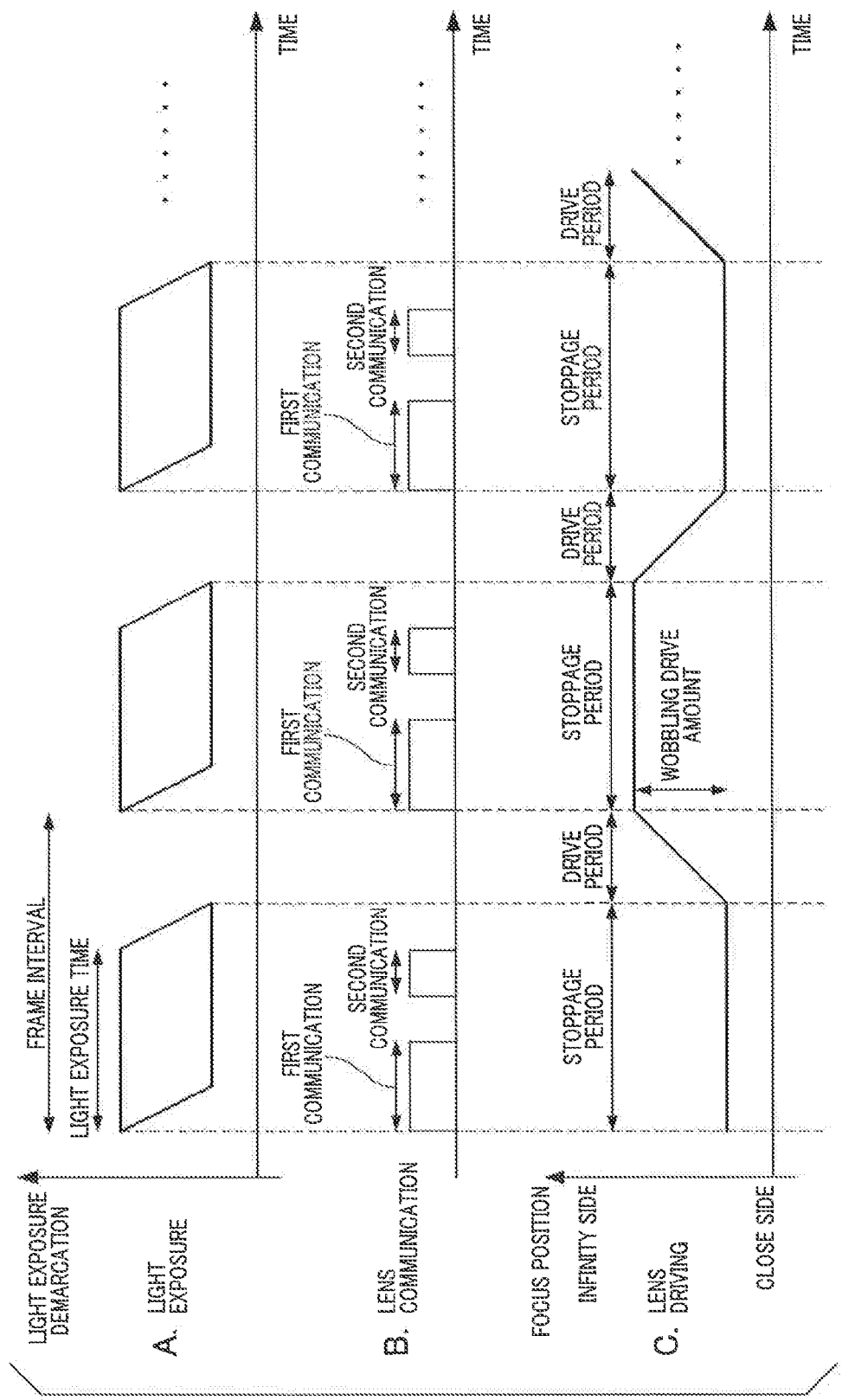

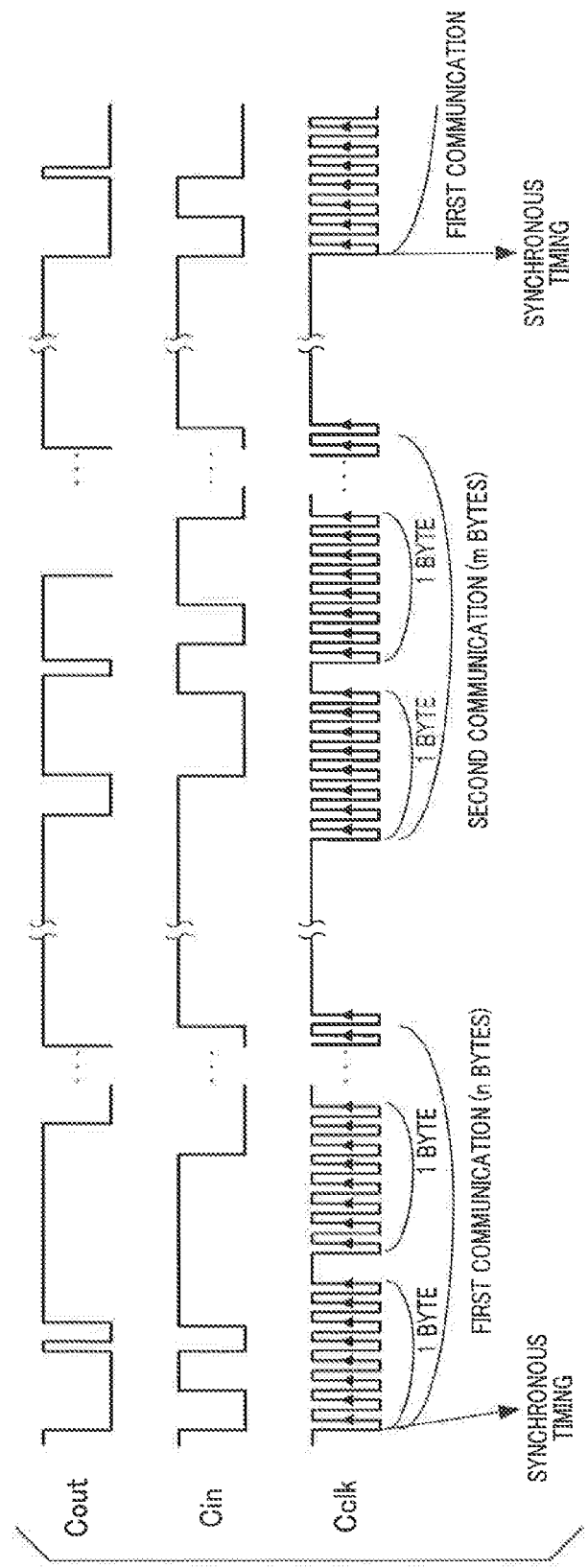

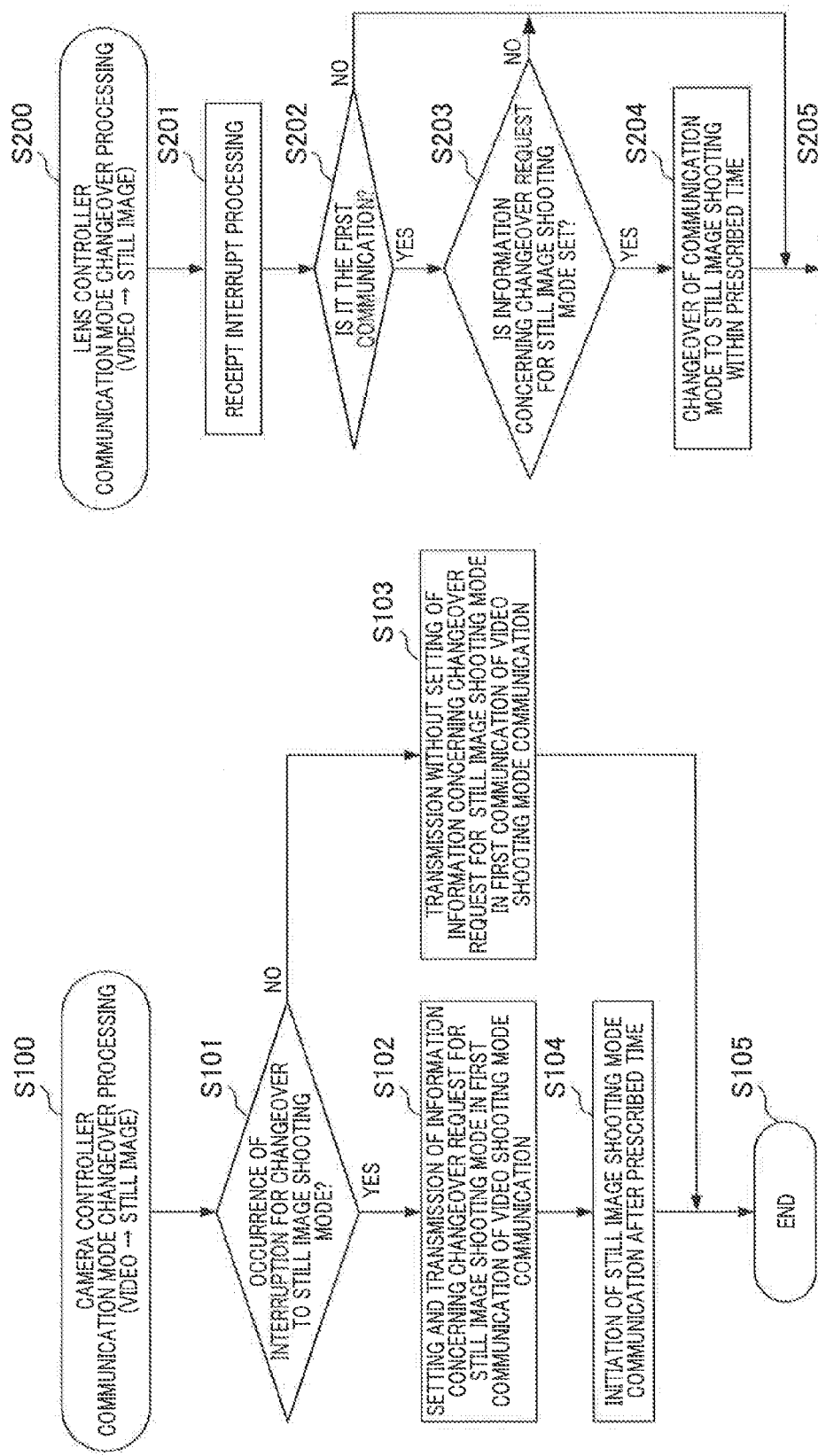
FIG. 7A / FIG. 7B

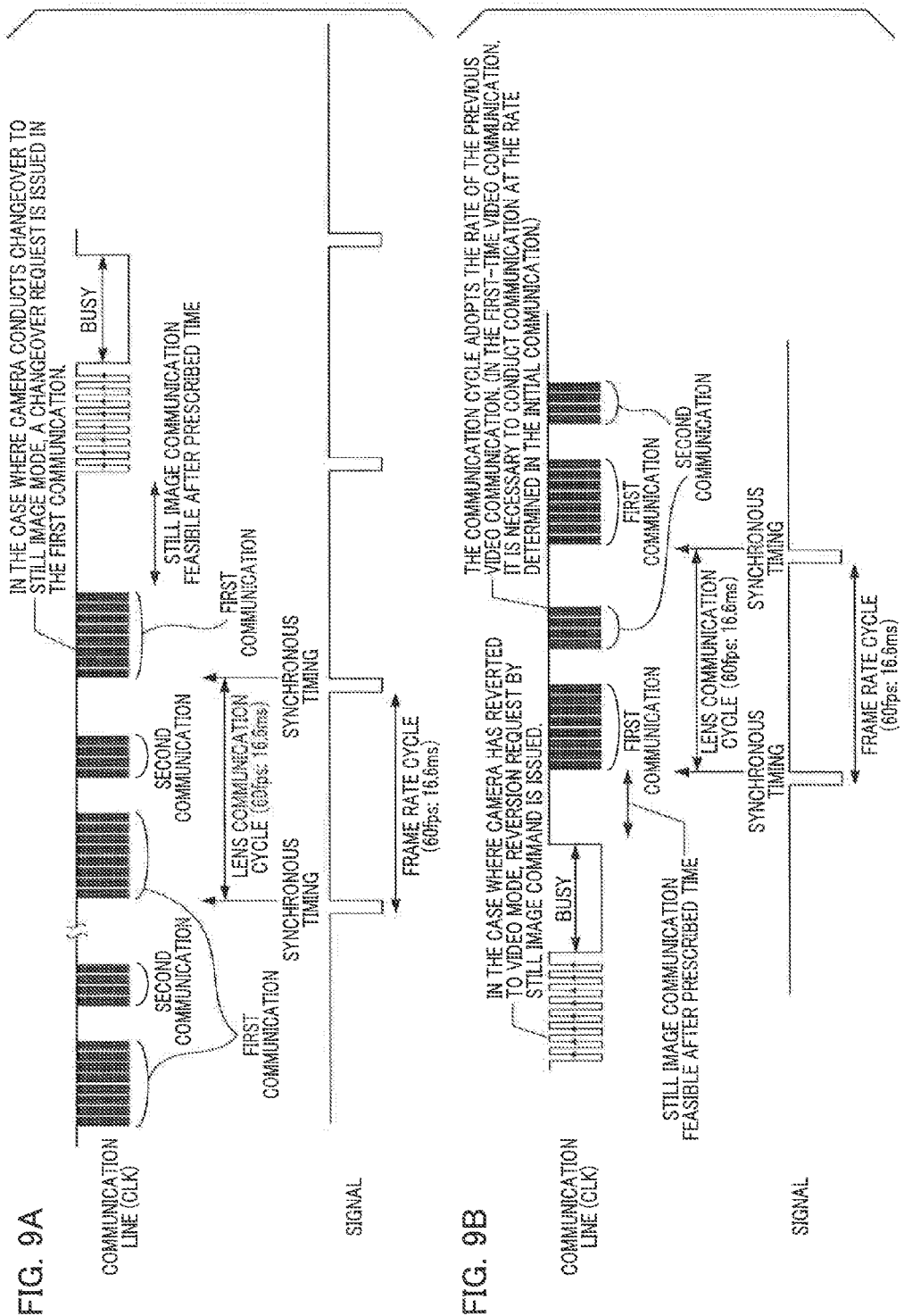

IMAGING APPARATUS, LENS APPARATUS, AND IMAGING APPARATUS CONTROL METHOD

BACKGROUND OF THE INVENTION

1. Field of the Invention

The present invention relates to a camera system consisting of a lens apparatus and an imaging apparatus body enabling removable attachment of the lens apparatus, and to a technology that changes communication methods between the two apparatuses according to shooting modes.

2. Description of the Related Art

In recent years, there has been an ongoing shift from film-type cameras to digital cameras that use imaging elements. In addition to still-image shooting, video shooting has become possible even with so-called single-lens reflex cameras with interchangeable lenses. Now, with respect to the body unit of a single-lens reflex camera, there is not only the type in which a photographic object is viewed using an optical view system including a so-called reflex mirror, but also the type in which viewing is conducted with display of a photographic image on a monitor screen. During video imaging and preview imaging, operation (so-called "wobbling operation") is conducted in which a focus lens is minutely driven forward or backward from a lens position where the AF (autofocus) evaluation value is at maximum. By this means, the vicinity of the subject can be constantly kept in focus to obtain an optimal focus state.

FIG. 10A and FIG. 10B are explanatory views of wobbling operation in a conventional imaging apparatus. FIG. 10A exemplifies exposure control, and FIG. 10B exemplifies focus lens drive control. Time is represented on the horizontal axis. In wobbling operation, the periods corresponding to light exposure times are the focus lens stoppage periods, and the intervals between these are the drive periods. Users are mostly unaware of focus misalignments, because the focus lens is driven within a range that does not enable discrimination of focus misalignments from captured video images. This technology is disclosed in Japanese Patent Application Laid-Open No. 9-284632.

In contrast to still-image shooting, with video shooting, an actuator in an interchangeable lens must be continuously driven for purposes of focusing, diaphragm driving, and the like. Consequently, it is important to conduct drive control by frequently monitoring the state of the interchangeable lens. Monitoring of the state of an interchangeable lens and drive control of the respective actuator are accomplished by a communication function executed between the interchangeable lens and the camera body. In a conventional communication method, the camera body transmits a communication command requesting lens information to the interchangeable lens. The interchangeable lens sends information corresponding to the aforementioned command received from the camera body at the next communication time. With this communication method, for example, it is necessary for the camera body to transmit to the lens side one command communication to acquire the status of the interchangeable lens, and two more communications for data reception. In short, three communications are required for two data acquisitions. In the case of video shooting, focus correction data and diaphragm value data must be communicated more frequently than in still-image shooting, with the result that wasteful communication increases, and efficiency is reduced.

In Japanese Patent Application No. 2010-511871, a method is proposed in which the appropriate communication method between camera and interchangeable lens is used in still-image shooting mode and in video shooting mode, respectively. In Japanese Patent Application No. 2010-511871, as methods for switching communication methods according to mode, there is disclosure of a changeover method in which the camera transmits a changeover request, and receives a changeover completion notification from the lens, and a changeover method in which changeover is performed at a fixed time after transmission of a changeover request.

In the switching of a conventional communication method, processing time must be shortened. The reason for this is that when communication methods are switched between a video shooting mode and a still-image shooting mode in a camera capable of video shooting and still-image shooting, communication must be conducted multiple times, which takes up processing time. Moreover, with the method in which communication method changeover is performed at a fixed time after changeover request transmission, it is not necessarily the case that communication can always be conducted at a fixed time even with a high-performance lens. In such cases, there is the possibility that changeover processing cannot be rapidly conducted.

SUMMARY OF THE INVENTION

The imaging apparatus that can attach interchangeable-lenses and has multiple shooting modes of the present invention changes communication methods according to shooting mode in a short time.

One embodiment of the apparatus of the present invention is an imaging apparatus that is equipped with a lens apparatus, and that conducts imaging operations according to shooting modes by communicating with the pertinent lens apparatus. The imaging apparatus includes contacts to which the lens apparatus is electrically connected, and a control unit configured to change between a first communication method and a second communication method according to the shooting modes, and conduct communication processing with the lens apparatus via the aforementioned contacts. Upon changeover from the first communication method to the second communication method, the control unit conducts control so that information concerning a communication method changeover request is transmitted to the lens apparatus, and communication by the second communication method is initiated after elapse of a transition time that is indicated by time information that is retained in advance.

According to the present invention, it is possible to change between communication methods in a short time when switching shooting modes.

Further features of the present invention will become apparent from the following description of exemplary embodiments with reference to the attached drawings.

BRIEF DESCRIPTION OF THE DRAWINGS

FIG. 4A to FIG. 4C are drawings which exemplify communication timing when wobbling operation is conducted.

FIG. 5 is a drawing which exemplifies a communication waveform in a video shooting mode.

FIG. 7A and FIG. 7B are flowcharts which show examples of changeover processing from a communication method for a video shooting mode to a communication method for a still-image shooting mode.

FIG. 9A and FIG. 9B are drawings which explain communication timing when changeover occurs between a video shooting mode and a still-image shooting mode.

DESCRIPTION OF THE EMBODIMENTS

Figure 1:
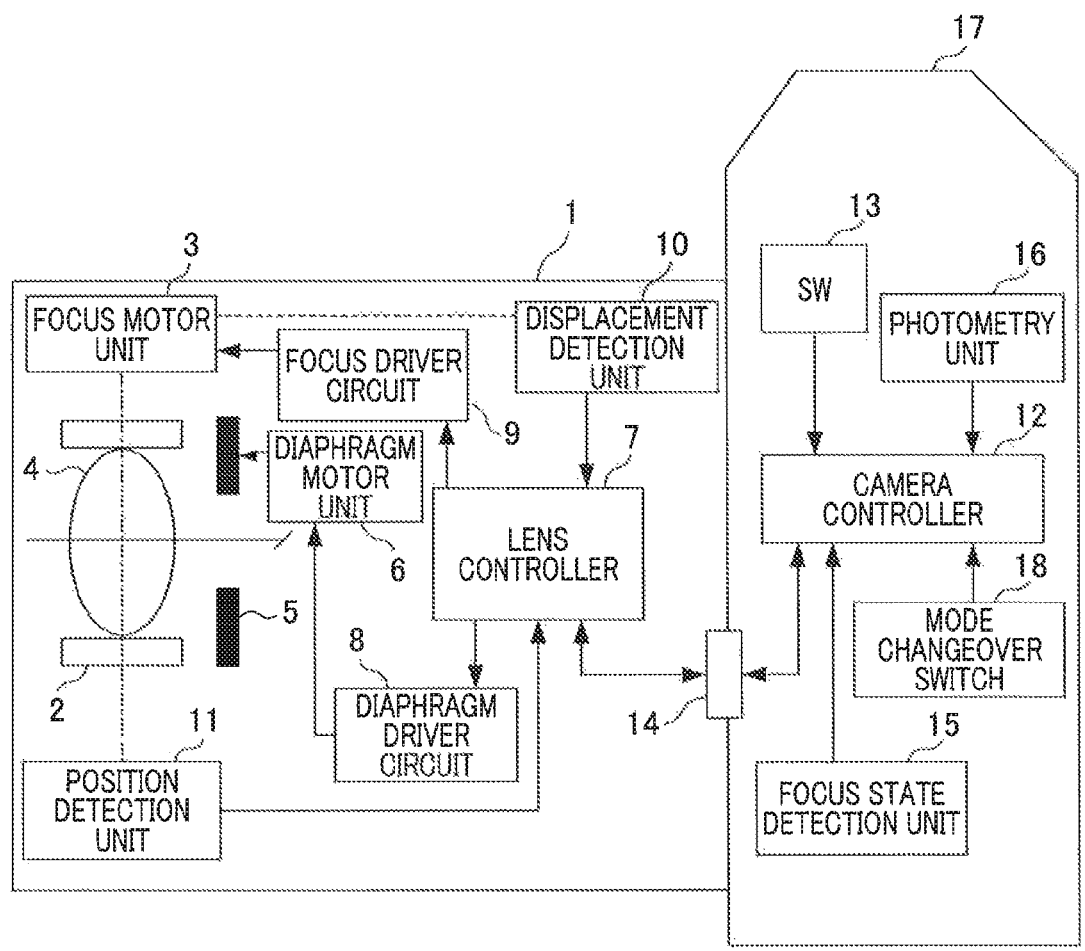
FIG. 1 shows an exemplary configuration of a lens apparatus and an imaging apparatus body of an embodiment of the present invention.

An embodiment of the present invention is described below in detail based on appended drawings. As the imaging apparatus, an autofocus single-lens reflex digital camera that can attach interchangeable lenses is exemplified in the description. In the imaging apparatus, still-image shooting mode and a video shooting mode can be selected, and the imaging apparatus conducts imaging operations corresponding to the respective modes. A configuration of a camera system including an imaging apparatus and a lens apparatus is described with reference to FIG. 1. FIG. 1 is a block diagram which shows an exemplary configuration of an interchangeable lens 1 and a camera body 17.

The interchangeable lens 1 is a lens apparatus detachable to the camera body 17, and is provided with an imaging optical system. FIG. 1 shows only a focus lens 4, but various optical members such as a zoom lens and an image stabilization lens are provided. A focus lens unit 2 holds the focus lens 4, and is capable of bringing a subject into focus by moving it in a direction parallel to the optical axis. A focus motor unit 3 includes a focus motor that is designed to move the focus unit 2 and multiple gear trains that are a speed-reduction mechanism for focus unit 2. A focus driver circuit 9 drives the focus motor unit 3 according to control signals from a below-described lens controller 7. A diaphragm unit 5 adjusts the amount of light, and a diaphragm motor unit 6 includes a diaphragm motor that is designed to drive the diaphragm unit 5 and multiple gear trains that are a speed-reduction mechanism for the diaphragm unit 5. A diaphragm driver circuit 8 drives the diaphragm motor unit 6 according to control signals from the below-described lens controller 7.

The lens controller 7 which governs control of the interchangeable lens 1 has a function of communication with the camera body 17, a timer function, a DAC (digital-analog conversion) function, an input/output port control function, and a memory function. A serial communication unit is used as the communication unit of the lens controller 7 and the controller of the camera body 17. The serial communication unit is capable of conducting communication in two communication methods which are a first communication method in a video shooting mode and a second communication method in a still-image shooting mode. The details of the communication methods corresponding to the shooting modes are described below. In addition, the lens controller 7 is provided with memory devices such as a ROM (read-only memory) and a RAM (random access memory).

A displacement detection unit 10 which detects the amount of rotation of the focus motor is configured with a small disk that rotates in synchronization with rotation of the focus motor and a photo-interrupter element. The disk is notched at approximately equal pitch in the circumferential direction, and constitutes an optical rotary encoder. The lens controller 7 controls the focus motor based on detection results from the displacement detection unit 10. In short, the lens controller 7 detects the rotational speed of the focus motor and further the speed of the focus lens 4 by receiving signals from the photo-interrupter element, and by measuring the time interval of one pitch thereof. A position detection unit 11 detects a position of the focus lens 4, and transmits detection information to the lens controller 7. This detection information indicates at which position the focus lens 4 is located between an infinity side and a close side.

The camera body 17 is provided with a camera controller 12 that governs the entirety of its control. The camera controller 12 is provided with a serial communication unit for the lens controller 7, and has a timer function, a DAC (digital-analog conversion) function, an input/output port control function, and a memory function using ROM, RAM, and the like. The serial communication unit performs communication processing in a first communication method for a video shooting mode, and in a second communication method for a still-image shooting mode. In addition, the camera controller 12 conducts control such as activation and stoppage of a video sequencer that conducts video shooting processing, and a still-image sequencer that conducts still-image shooting processing.

A control panel which issues operational instructions to the imaging apparatus is provided with a release switch 13. The release switch 13 is a two-stage switch which is employed by the user for focusing and release operations, and which transmits operational instructions to the camera controller 12. By a first stroke (half push) operation of the release button (not illustrated in the drawing) by the user, a first switch (hereinafter SW1) is turned on, and photography preparation processing such as focusing is initiated. By a second stroke (full push) of the release button by the user, a second switch (hereinafter SW2) is turned on, initiating a photographic operation.

A contact unit 14 is provided for purposes of conducting communication with the lens controller 7. Multiple metallic projections exist on the camera body 17 side, and multiple metal pieces for engagement with the projections are embedded on the interchangeable lens 1 side. When the interchangeable lens 1 is attached to the camera body 17, the lens controller 7 and the camera controller 12 are electrically connected, enabling reciprocal communication.

A focus state detection unit 15 detects whether or not the subject is in focus—i.e., the focus state—and transmits detection information to the camera controller 12. With an autofocus single-lens reflex camera body, a phase difference detection method employing multiple line sensors is common. In addition, in the case of video shooting, there is also a method (a so-called wobbling method) in which focus misalignments are detected by micro-driving the focus lens 4. This wobbling method is common in video cameras. A photometry unit 16 which determines exposure during shooting outputs photometric data to the camera controller 12.

A mode changeover switch 18 is a mode selection unit, and information on the mode selected by user operation is transmitted to the camera controller 12. The user can select a still-image shooting mode or a video shooting mode as the photographic mode of the camera body 17. Although not illustrated in the drawings, the camera body 17 is provided with an imaging element which performs photoelectrical conversion of light that transits the imaging optical system, a camera signal processing circuit, and the like. Image data after shooting is displayed on a screen such as an LCD (liquid crystal display device), and stored in a recording medium.

Next, operations of the interchangeable lens 1 and the camera body 17 are described. When detecting that the first switch SW1 of the release switch 13 is on, the camera controller 12 initiates autofocus (hereinafter abbreviated as AF) operation and acquires focus state detection data from the focus state detection unit 15. The focus state detection data includes information concerning an amount of focus misalignment of the subject. The camera controller 12 computes a drive amount of the focus lens unit 2 for purposes of focus adjustment based on the detected focus misalignment amount. The computation result is transmitted to the lens controller 7 through the contact unit 14.

The lens controller 7 receives data from the camera controller 12, and instructs the focus driver circuit 9 based on the data indicating the drive amount of the focus lens unit 2. By this means, the focus motor inside the focus motor unit 3 is driven. When the focus motor begins to rotate, the focus unit 2 that is connected to the gear trains is driven, and the focus lens 4 begins to move. The lens controller 7 detects by the displacement detection unit 10 whether or not the focus lens 4 has moved to a position corresponding to the drive amount received from the camera controller 12. When it is discriminated that the focus lens 4 has reached the instructed position, the focus driver circuit 9 suspends movement of the focus lens 4.

Next, in the case where the second switch SW2 of the release switch 13 is turned on, the camera controller 12 acquires photometric data from the photometry unit 16, determines a shutter speed and a diaphragm value, and transmits the data to the lens controller 7. The lens controller 7 issues a diaphragm driving instruction to the diaphragm driver circuit 8, and the diaphragm motor unit 6 is operated by driving the diaphragm motor. As a result of operation of the diaphragm motor unit 6, the diaphragm unit 5 which is connected to the diaphragm motor unit 6 by the gear trains is driven. The lens controller 7 discriminates whether or not the diaphragm value instructed by the camera controller 12 is reached by a drive step number of the stepping motor that is the diaphragm motor. In the case where it is discriminated that the instructed diaphragm value has been reached, the diaphragm driver circuit 8 suspends driving of the diaphragm.

The lens controller 7 conducts lens driving based on the focus control information and the diaphragm value. Upon receiving a transmission request pertaining to the current status of the interchangeable lens 1 from the camera controller 12 during this driving, the lens controller 7 notifies the camera controller 12 that each unit is in the process of operation. A communication of data representing a status of the interchangeable lens 1 is called a "lens status communication," and when the camera controller 12 acquires data by a lens status communication, it awaits termination of operation of the interchangeable lens 1, and performs a release operation after termination of operation.

Figure 2:
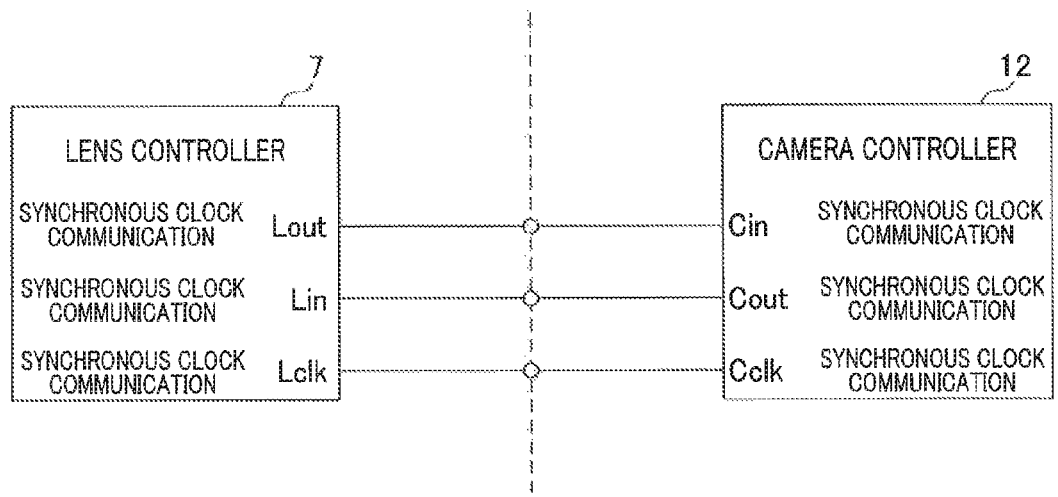
FIG. 2 shows contacts of a camera body and an interchangeable lens.

FIG. 2 is a drawing which is a schematic representation of contacts between the interchangeable lens 1 and the camera body 17. In FIG. 2, communication terminals of the lens controller 7 are shown on the left side, and communication terminals of the camera controller 12 are shown on the right side as terminal arrays employed in synchronous clock communication.

The lens controller 7 and the camera controller 12 are connected by the contact unit 14 shown in FIG. 1. $L_{out}$ of the lens controller 7 is a lens data output terminal which outputs lens information, $L_{in}$ is a camera body data input terminal which inputs information from the camera body 17, and $L_{clk}$ is a synchronous clock input/output terminal.

On the other hand, in the camera controller 12, $C_{in}$ is a lens data input terminal corresponding to the aforementioned $L_{out}$, $C_{out}$ is a camera body data output terminal, and $C_{clk}$ is a synchronous clock input/output terminal. In short, $C_{clk}$ is a first communication terminal which transmits a clock signal generated by the camera controller 12 to the lens controller 7. $C_{in}$ and $C_{out}$ are second communication terminals which communicate data to and from the lens controller 7 according to clock signals. The characteristic feature of synchronous clock communication is that the communication clock rate can be relatively quick, because it is basically synchronous communication by a reference clock. At least three communication terminals are required in order to conduct two-way communication.

Figure 3:
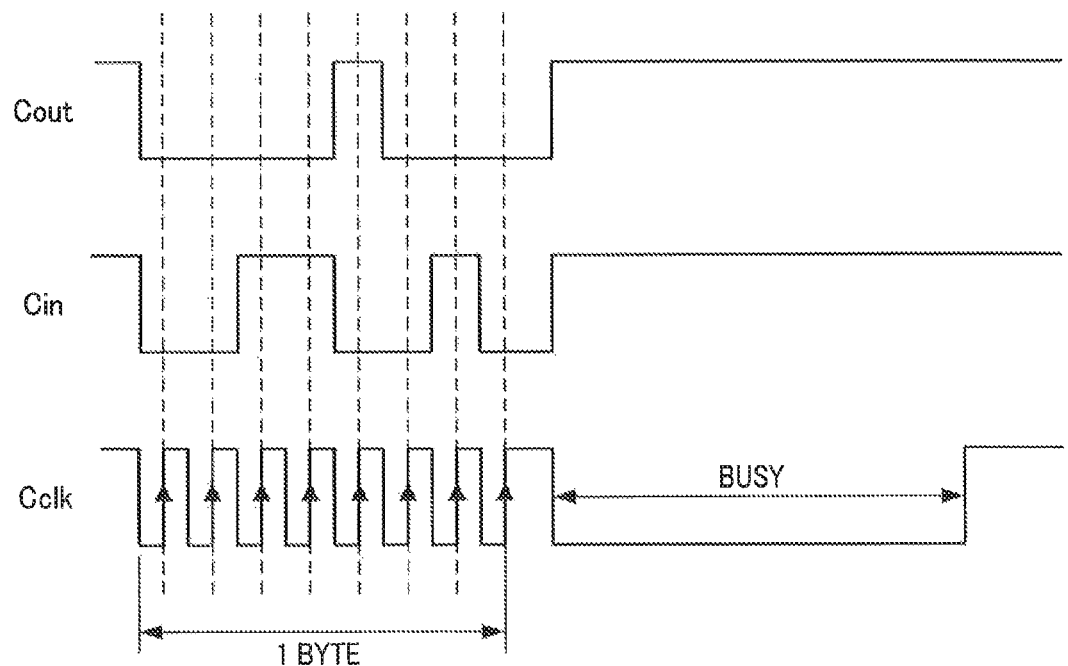
FIG. 3 is a drawing which exemplifies a communication waveform in a still-image shooting mode.

Next, the communication methods of the lens controller 7 and the camera controller 12 are described. First, the communication method during still-image shooting mode is described. FIG. 3 is a waveform drawing which represents the respective signals of the communication terminals $C_{out}$, $C_{in}$, and $C_{clk}$ in the communication method during still-image shooting mode. With synchronous clock communication, the camera controller 12 receives data from the lens controller 7 via $C_{in}$ in synchronization with startup of the clock signal of $C_{clk}$. The period during which the communication terminal $C_{clk}$ conducts output on level Lo for a fixed period of time represents a busy state in which the signal level of $C_{clk}$ is lowered to Lo by the camera controller 12, and the processing of the camera body side is awaited. When processing is terminated, the camera controller 12 returns the level of the communication terminal $C_{clk}$ to Hi. FIG. 3 shows the state in which the camera controller 12 is receiving 32 HEX data from the lens controller 7. Similarly, in synchronization with startup of the clock signal of $C_{clk}$, the camera controller 12 transmits data to the lens controller 7 via $C_{out}$. As this processing is conducted by the same procedure as $C_{in}$, a detailed description thereof is omitted.

Next, a description is given of communication commands received and transmitted between the lens controller 7 and the camera controller 12. Table 1 is a table of communication commands which are transmitted by the camera controller 12 to the lens controller 7, and sets forth the camera command, the data volume, and the meaning of the command. The volume of data returned to the camera controller 12 by the lens controller 7 is determined in advance by the command (command requesting lens information).

TABLE 1

| Camera command | Data volume | Meaning of command |
|---|---|---|
| AA | DA | Optical data transmission request |
| AB | DB | Current status transmission request |
| AC | DC | Characteristic data receipt request |
| AD | DD | Initial data transmission request |
| AE | DE | Changeover request for video shooting mode communication |
| AF | DF | AF operation initiation command |

For example, when command AA is transmitted to the lens controller 7 from the camera controller 12, the lens controller 7 recognizes this command as a data transmission request relating to optical data. In this case, DA byte data is transmitted to the camera controller 12 in synchronization with a clock signal of communication terminal $C_{clk}$.

As an example of another camera command (a command requesting lens information), command AB is a request for transmission of DB byte data representing the lens status. This data includes information representing the current lens status such as that focus operation is underway, or diaphragm operation is underway. Command AC is a command requesting receipt of characteristic data for DC byte data, and is used in the case where the camera controller 12 issues a request for receipt of characteristic data of the interchangeable lens 1. Command AD is a command requesting initial data transmission of DD byte data, and is a command with which the camera controller 12 checks with the lens controller 7 about time information and the like upon changeover of communication method. This command requesting initial data transmission is unfailingly issued at the time of camera activation or at the time of lens attachment. The required data of time information and the like during changeover of communication methods is stored in the ROM in the lens controller 7. The camera controller 12 transmits the command requesting initial data transmission to the lens controller 7 to acquire the necessary data. Command AE is a command requesting changeover to the communication method for the video shooting mode. Command AF is a command for initiation of AF operation.

The following Table 2 sets forth a table of communication commands that are transmitted to the camera controller 12 by the lens controller 7.

TABLE 2

| Camera command | Data volume | Meaning of command |
| --- | --- | --- |
| BA | DA | Optical data receipt request |
| BB | DB | Current status receipt request |
| BC | DC | Characteristic data receipt request |
| BD | DE | Changeover request for video shooting mode communication |
| BE | DF | AF operation initiation command |

Commands BA, BB, and BC are all commands requesting data receipt. Command BD is a command requesting changeover to the first communication method for the video shooting mode. Command BE is a command for initiation of various operations, and is a camera body operational command for navigation of operations on the camera body side by a switch (not illustrated in the drawings) provided in the interchangeable lens 1. With respect to commands transmitted by the interchangeable lens 1, there are many other types as well, but detailed description thereof is omitted.

Next, a description is given of the communication method for the video shooting mode. FIG. 4A to FIG. 4C exemplify communication timing when wobbling operation is conducted in the video shooting mode. With the light exposure control shown in FIG. 4A, the horizontal axis is adopted as the time axis, where frame intervals and light exposure time are shown. FIG. 4B shows communication processing of the lens controller 7 and the camera controller 12, and the horizontal axis is the time axis. With the lens drive control shown in FIG. 4C, the horizontal axis is adopted as the time axis, and the position of the focus lens 4 is shown on the vertical axis; stoppage periods and wobbling drive periods are shown.

First, the camera controller 12 is synchronized with the light exposure processing of the imaging element, and communicates with the lens controller 7 for purposes of initiating wobbling drive. In the present embodiment, a first communication of "n" byte data, and a second communication of "m" byte data are conducted. n is a larger value than m. Drive control of the focus lens 4 is conducted by cyclically repeating a continuous communication consisting of the multiple communications between the lens controller 7 and the camera controller 12. The lens controller 7 conducts wobbling drive control of the focus lens 4 base on the data received from the camera controller 12 in the second communication.

FIG. 5 is a waveform drawing which represents the respective signals of the communication terminals $C_{out}$, $C_{in}$, and $C_{clk}$ in the communication method of the video shooting mode. The first communication and the second communication are conducted between the lens controller 7 and the camera controller 12 at each light exposure cycle corresponding to a frame of an imaging signal. When the signal level of the communication terminal $C_{clk}$ is switched from Lo to Hi, the lens controller 7 acquires data from the camera controller 12 via the communication terminal $C_{out}$ and inputs it to an internal register. The exchange of this signal is repeated for a total of 8 times (an 8 bit portion), and the lens controller 7 and the camera controller 12 store it in memory as 1 byte of data for use in internal processing. By repeating transmission and receipt of this signal n times, the first communication totaling n bytes of data is conducted. The first communication is primarily communication for purposes of having the camera controller 12 acquire lens information such as the focal distance or the subject distance retained by the lens controller 7. The camera controller 12 performs AF arithmetic processing based on the acquired information, and computes correction values and the like required for drive control of the focus lens 4. The second communication is primarily communication for purposes of transmitting the computation results of AF arithmetic processing to the lens controller 7. Transmission processing is conducted by the same method as the first communication.

Figure 6A:
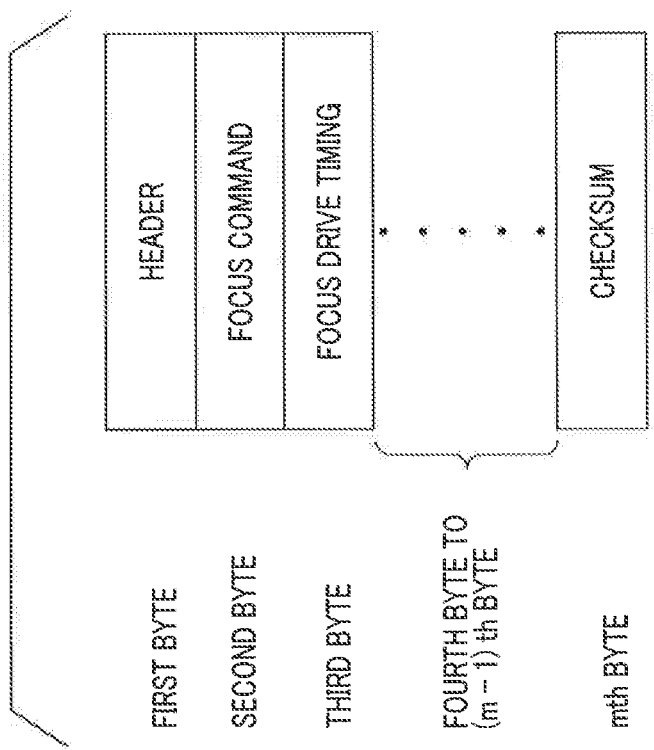
FIG. 6A and FIG. 6B are drawings which illustrate an exemplary configuration of communication data in a video shooting mode.

FIG. 6A exemplifies data of the first communication issued from the camera controller 12 to the lens controller 7 in the video shooting mode. In a first byte, header information is stored which is used to identify the first communication. In a second byte, information concerning a communication method changeover request is stored for purposes of switching the communication method from the video shooting mode to the still-image shooting mode. In a third byte, camera status information including the current camera temperature and the like is stored. From a fourth byte to an (n−1)th byte, various types of information are contained such as zoom control information and diaphragm control information, but the details thereof are omitted. In an nth byte, checksum information is stored for purposes of error detection. Note that the first communication is two-way communication, in which lens information (focal distance information, subject distance information, etc.) and the like are simultaneously transmitted from the lens controller 7 to the camera controller 12.

Figure 6B:
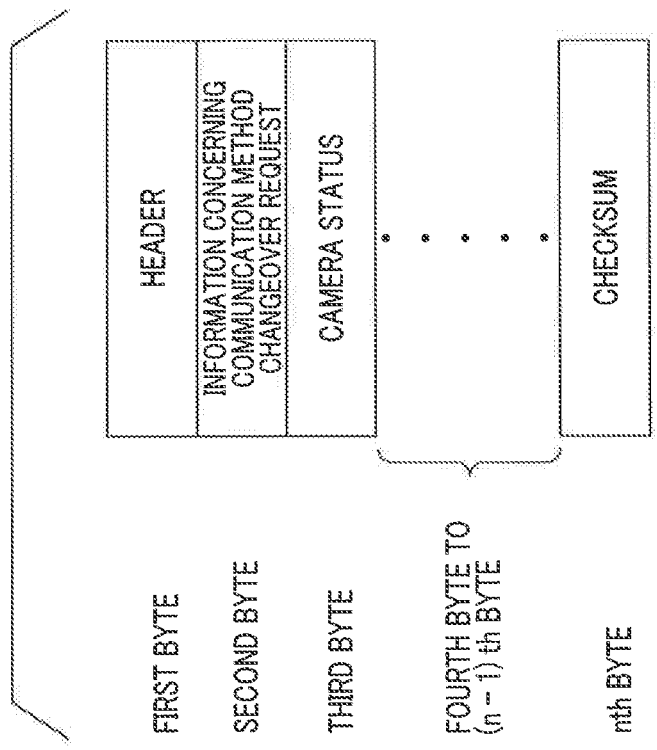

FIG. 6B exemplifies data of the second communication issued from the camera controller 12 to the lens controller 7 in the video shooting mode. In a first byte, header information is stored for use in identifying the second communication. In a second byte, focus command information is stored, i.e., information indicating commands for stoppage and specific driving of the focus lens 4. In a third byte, drive timing information of the focus lens 4 is stored. From a fourth byte to an (m−1)th byte, various types of information (not illustrated in the drawings) such as AF drive speed and displacement amount are stored. In an mth byte, checksum information for error detection is stored.

The camera controller 12 maintains the signal level of the communication terminal $C_{clk}$ at Hi when the first communication and the second communication are completed, and then lowers the signal level of the communication terminal $C_{clk}$ from Hi to Lo when communication is conducted at the next light exposure termination timing. Until then, the lens controller 7 awaits lowering of the signal level of the communication terminal $C_{clk}$ from Hi to Lo, and when the signal level is lowered from Hi to Lo after passage of a fixed period or more, it treats that point as the timing for synchronization with the light exposure of the camera. Subsequently, when the signal level of the communication terminal $C_{clk}$ is changed from Lo to Hi, the lens controller 7 incorporates the data into an internal register via the communication terminal $C_{out}$, and conducts the first communication of n bytes of data and subsequent the second communication of m bytes of data in the same manner as the previous communications.

Next, a description is given of an example of communication method changeover processing, referencing FIG. 7 and FIG. 8. FIG. 7A exemplifies changeover processing from the video shooting mode to the still-image shooting mode, which is performed by the camera controller 12. In S100, the processing is initiated, and in S101, the camera controller 12 discriminates whether or not the shooting mode has been switched to the still-image shooting mode. Now, interrupt processing of a request for still-image shooting mode changeover occurs when a mode changeover instruction is conducted by user operation using a mode changeover switch 18. Or the aforementioned interrupt processing occurs when focusing operation terminates after issuance of a focusing command triggered by an operational signal of the first switch SW1. In the case where it is discriminated in S101 that interrupt of a request for changeover to the still-image shooting mode has occurred, the processing advances to S102, and in the case where it is discriminated that interrupt has not occurred, the processing advances to S103.

In S102, the camera controller 12 sets information concerning a communication method changeover request for the still-image shooting mode (see FIG. 6A) in the second byte of the first communication in the communication method for the video shooting mode, and transmits it to the lens controller 7. Subsequently, in S104, the camera controller 12 awaits passage of a prescribed time, and conducts processing for transition to the still-image shooting mode. The prescribed time (hereinafter referred to as "first transition time") is, for example, a time acquired in advance from the lens controller 7 by an initial communication, or a preset fixed time or the like. In embodiments where the first transition time is acquired from the lens controller 7, time information corresponding to the first transition time is retained in the interchangeable lens 1. By this means, obtainment of a first transition time conformed to the performance of the interchangeable lens 1 is facilitated. On the other hand, according to other embodiments, the first transition time is not acquired from the lens controller 7. Instead, the camera controller 12 retains the first transition time before hand. By this means, although it cannot be conformed to the performance of the interchangeable lens 1, if the first transition time itself is a short time, there is the advantage that the data receipt and transmission of the initial communication can be allotted to other information, and that the necessity of establishing settings by interchangeable lens 1 is relatively reduced. When transition to the still-image shooting mode occurs, the camera controller 12 stops the video sequencer, and switches to command communication. However, even if the camera controller 12 receives notification of data from the lens controller 7 in the period until passage of the first transition time, this is treated as a communication error. Processing then advances to S105, and terminates.

On the other hand, in the case where processing advances from S101 to S103, the camera controller 12 conducts communication processing in which information concerning communication method changeover request for the second communication method is not set in the second byte of the first communication. In short, the communication method for the video shooting mode continues. Processing then advances to S105, and terminates.

Note that the first communication between the lens controller 7 and the camera controller 12 is two-way communication. The lens information (focal distance information, subject distance information, etc.) received by the camera controller 12 in the first communication of S102 can be used as valid information even during the still-image shooting mode after changeover. On the other hand, the lens controller 7 may add information (a flag or the like) indicating that the data transmitted in the first communication in S102 is valid, and may transmit it to the camera controller 12. The camera controller 12 acquires the information indicating validity of the data by the first communication, determines what the pertinent information is, and can discriminate whether the data is valid or invalid.

Next, referencing the flowchart of FIG. 7B, a description is given of changeover processing from the communication method for the video shooting mode to the communication method for the still-image shooting mode, conducted by the lens controller 7. In S201, the lens controller 7 conducts interrupt processing of the received communication data. Next, in S202, it is determined whether or not the received data is data of the first communication. In the case where the result of determination is that it is data of the first communication, the processing advances to S203. In the case where it is not data of the first communication, the processing advances to S205, and the processing terminates.

In S203, it is determined whether or not information concerning the communication method changeover request (see FIG. 6A) for the still-image shooting mode is set in the data received in the first communication. In the case where information concerning the communication method changeover request for the still-image shooting mode is set, the processing advances to S204. In the case where the pertinent information is not set, the processing advances to S205, and changeover of the communication methods is not performed.

In S204, the lens controller 7 conducts processing to switch to the communication method for the still-image shooting mode after passage of the first transition time in accordance with the retained time information. At the time of transition to the still-image shooting mode, processing is executed in which the video sequencer and wobbling control are promptly stopped, and changeover to command communication is performed. However, even if the lens controller 7 is notified of a data from the camera controller 12 within the first transition time, it treats it as a communication error.

In the two-way communication between the lens controller 7 and the camera controller 12, the lens controller 7 discriminates the existence or absence of information concerning a communication method changeover request in the received first communication data, and may also judge the validity of received information other than the pertinent information. In short, the lens controller 7 determines whether or not information that is valid for lens control is included in the received information at the point when communication method changeover request information is acquired. In this case, the lens controller 7 can execute lens control based on valid information sent from the camera controller 12 even during the period of the video shooting mode including the first transition time. This information is, for example, optical system information such as diaphragm value information or lens position information that can be utilized in still-image shooting. However, after communication method changeover, in the case where a conflict occurs with a command communication that is requested from the camera side in the communication method for the still-image shooting mode, the pertinent command communication takes precedence.

Figure 8B:
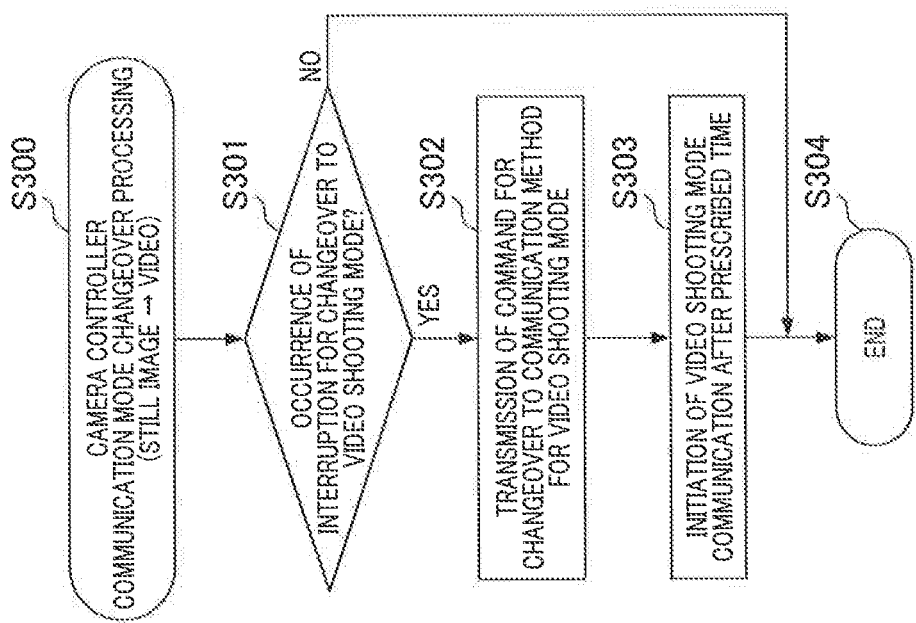
FIG. 8A and FIG. 8B are flowcharts which show examples of changeover processing from a communication method for a still-image shooting mode to a communication method for a video shooting mode.
Figure 8A:
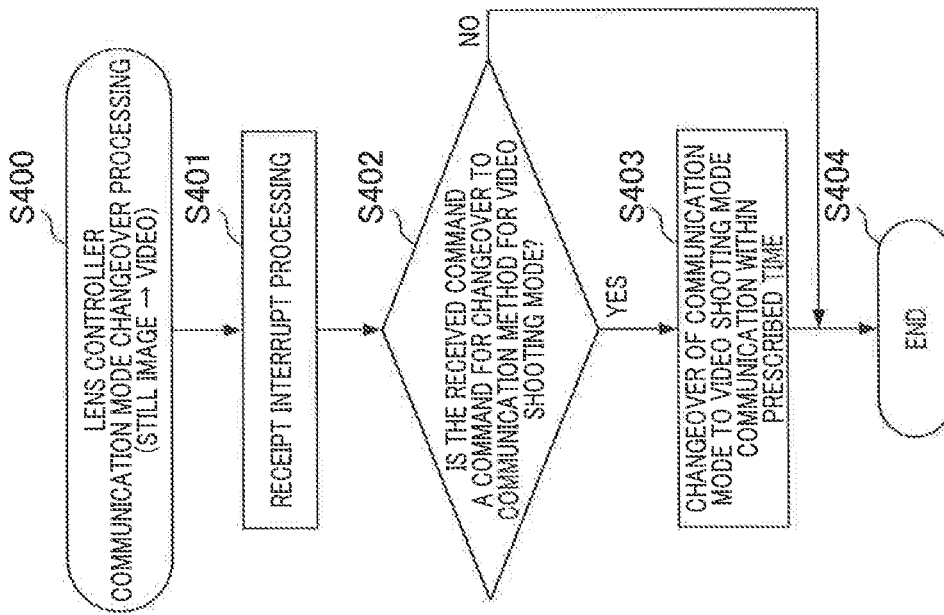
Figure 10:
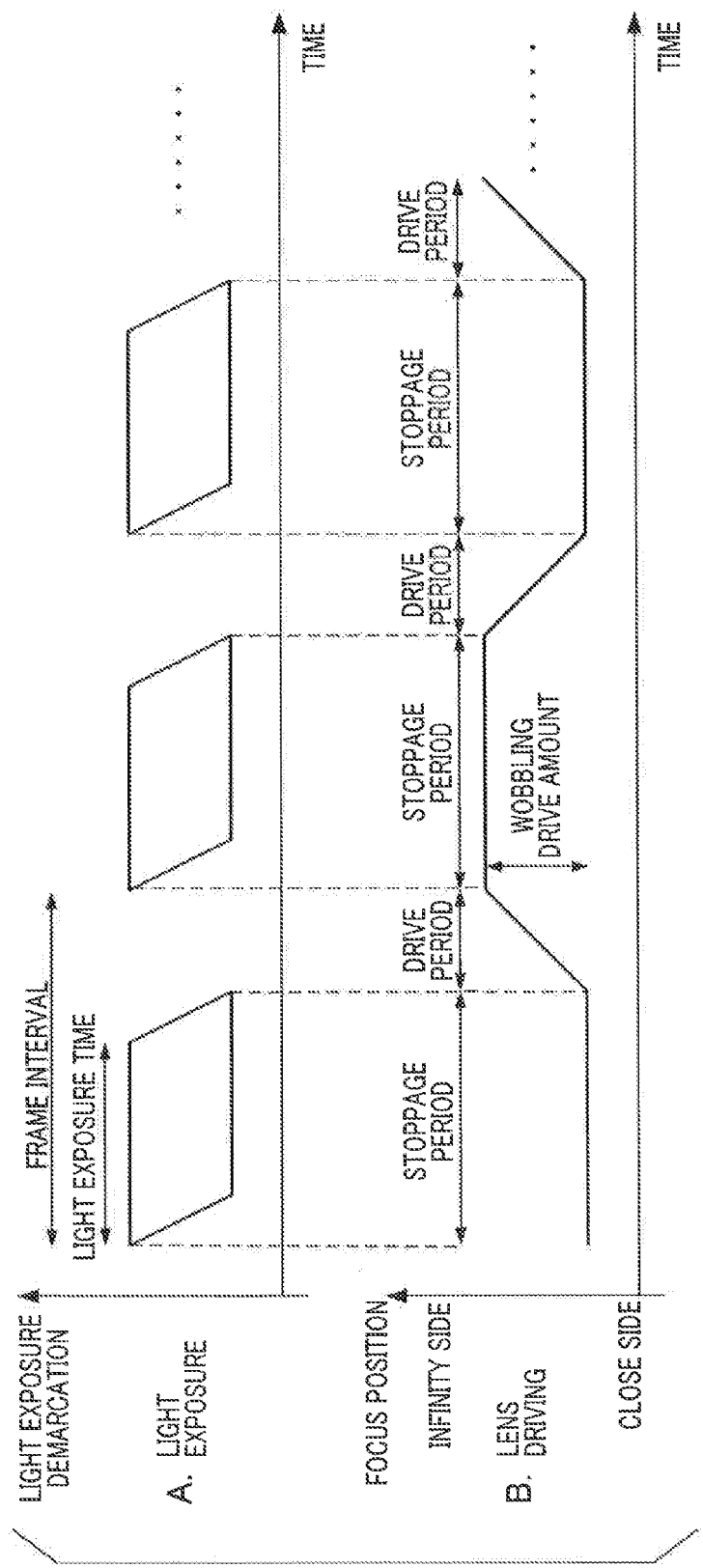
FIG. 10A and FIG. 10B are drawings which explain wobbling operation in a conventional imaging apparatus.

Next, referencing FIG. 8A and FIG. 8B, a description is given of changeover processing from the communication method for the still-image shooting mode to the communication method for the video shooting mode. FIG. 8A is a flowchart which exemplifies communication method changeover processing conducted by the camera controller 12.

In S300, processing is initiated, and in S301, it is determined whether or not the shooting mode has been switched to the video shooting mode. Interrupt processing of a request for changeover to the video shooting mode occurs, for example, when a mode changeover instruction is issued according to a setting made by user operation, or when a focusing command is issued by manipulation of the first switch SW1. Moreover, the aforementioned interrupt processing occurs even when a need for changeover to the communication method for the video shooting mode arises due to a cause on the lens controller 7 side. In the case where it is determined in S301 that interruption of a request for changeover to the video shooting mode has occurred, the processing advances to S302. In the case where it is determined that interruption has not occurred, the processing advances to S304, and terminates.

In S302, the camera controller 12 transmits a command for changeover to the communication method for the video shooting mode to the lens controller 7. In the following S303, the camera controller 12 awaits passage of a prescribed time, and conducts processing for transition to the video shooting mode. The prescribed time (hereinafter referred to as "second transition time") is, for example, a time indicating time information acquired in advance from the lens controller 7 by an initial communication, or a preset fixed time or the like. At the time of transition to the video shooting mode, processing is conducted in which the still-image sequencer is stopped, and the video sequencer is promptly activated. The first communication and the second communication are initiated between the lens controller 7 and the camera controller 12 within a set communication cycle, and synchronous communication is thereafter conducted in order to protect the jitter limits of the communication cycle, thereby assuring the first communication and the second communication.

Next, referencing the flowchart of FIG. 8B, a description is given of changeover processing from the still-image shooting mode to the communication method for the video shooting mode, conducted by the lens controller 7. In S401, the lens controller 7 conducts interrupt processing upon receiving communication command processing. In the following S402, it is determined whether or not the received command is a communication command for changeover to the communication method for the video shooting mode. In the case where the result of determination is that it is a command for changeover to the communication method for the video shooting mode, the processing advances to S403. In the case where the result of determination is that it is not a command for changeover to the communication method for the video shooting mode, the processing advances to S404, and terminates.

In S403, the lens controller 7 performs processing in which changeover to the communication method for the video shooting mode is performed within the second transition time according to the previously retained information of the second transition time. At the time of transition to the video shooting mode, processing is performed in which the still-image sequencer is stopped, and the video sequencer is promptly activated. The first communication and the second communication are initiated between the lens controller 7 and the camera controller 12 within the set communication cycle, and synchronous communication is thereafter conducted in order to protect the jitter limits of the communication cycle, thereby assuring the first communication and the second communication.

FIG. 9A exemplifies communication timing during changeover from the communication method for the video shooting mode to the communication for the still-image shooting mode. The data communication status is represented on the communication line, and the signal shown below is a vertical synchronous signal indicating the frame rate cycle of the imaging signal. The vertical synchronous signal is generated by a camera signal processing circuit (not illustrated in the drawings), and variation from Hi to Lo occurs cyclically according to a frame rate set by the camera. For example, if the frame rate is 60 fps (frames per second), the cycle is approximately 16.6 milliseconds. The first communication and the second communication are conducted within the set communication cycle, and FIG. 9A shows a status where the communication cycle matches the frame rate cycle. The first communication and the second communication are conducted between the lens controller 7 and the camera controller 12 according to a vertical synchronous signal that is synchronized with the light exposure timing of the imaging element. That is, in an ordinary communication method for a video shooting mode, the first communication is conducted in synchronization with the frame rate cycle, and the second communication is then conducted, whereby a continuous communication including the two is cyclically performed. Now, in the case of changeover to the communication method for the still-image shooting mode, the camera controller 12 sets the information concerning the communication method changeover request for the still-image shooting mode in the first communication, and transmits it to the lens controller 7. In this case, the second communication is not conducted. After communication is temporarily interrupted, and the first transition time has elapsed, command transmission is initiated in the still-image shooting mode. At this time, communication command transmission requests of the still-image shooting mode generated within the first transition time by user operation or due to a cause on the camera side are temporarily withheld, and transmission processing is sequentially initiated after the first transition time has elapsed.

FIG. 9B exemplifies communication timing during changeover from the communication method for the still-image shooting mode to the communication method for the video shooting mode. The camera controller 12 transmits a command requesting changeover to the communication method for the video shooting mode to the lens controller 7 by a command communication in the communication method for the still-image shooting mode. Subsequently, communication is initiated according to the communication method for the video shooting mode after passage of the second transmission time. With respect to the communication cycle, communication processing is conducted with adoption of the frame rate cycle used when communication was conducted in the previous video shooting mode. However, with respect to the first time that communication is conducted after switching to communication in the video shooting mode upon changing the communication method, communication must be conducted at the cycle determined beforehand in the initial communication between the lens controller 7 and the camera controller 12. From the second time onward, the first communication is conducted in synchronization with the frame rate cycle, followed by conduct of the second communication. The second transition time may be identical to the aforementioned first transition time, or it may differ from the first transition time according to the circumstances of communication.

According to the present embodiment, when the communication methods of the video shooting mode and the still-image shooting mode are changed, it is possible to implement changeover processing efficiently and in a short time by the receipt and transmission of data conducted between the camera body and the lens apparatus.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-129960 filed Jun. 7, 2012, which is hereby incorporated by reference herein in its entirety.

What is claimed is:

1. An imaging apparatus that can be equipped with a lens apparatus, comprising:
    contacts to which the lens apparatus is electrically connected; and
    a control unit configured to change between a first communication method and a second communication method, and conduct communication processing with the lens apparatus via the contacts,
    wherein, upon changeover from the first communication method to the second communication method, the control unit conducts control so that information concerning a communication method changeover request is transmitted to the lens apparatus, and communication by the second communication method is initiated after elapse of a transition time that is indicated by time information that is retained in advance, and
    wherein the first communication method includes a communication which synchronizes with a timing of an exposure processing of an imaging element, and the second communication method does not include the communication which synchronizes with a timing of an exposure processing of the imaging element.

2. The imaging apparatus according to claim 1, wherein the control unit conducts communication processing with the lens apparatus by cyclically repeating communication including a first communication and a second communication that follows the first communication in the first communication method.

3. The imaging apparatus according to claim 2, wherein the control unit transmits the information concerning the communication method changeover request to the lens apparatus by the first communication, upon the changeover from the first communication method to the second communication method.

4. The imaging apparatus according to claim 2, wherein the control unit conducts control so that the cyclical communication is initiated in synchronization with a next light exposure timing when a period in which communication vis-à-vis the lens apparatus is not conducted is elapsed after the cyclical communication is conducted in the first communication method.

5. The imaging apparatus according to claim 1, wherein the control unit interrupts communication after information concerning a communication method changeover request is transmitted to the lens apparatus, upon changeover from the first communication method to the second communication method.

6. The imaging apparatus according to claim 1, wherein the first communication method is a communication method for a video shooting mode, and the second communication method is a communication method for a still-image shooting mode.

7. The imaging apparatus according to claim 1, wherein the control unit conducts control so that communication is initiated in the first communication method after elapse of the transition time indicated by the time information, upon the changeover from the second communication method to the first communication method.

8. The imaging apparatus according to claim 1, wherein the control unit acquires the time information that is retained by the lens apparatus via the contacts.

9. The imaging apparatus according to claim 1, wherein the control unit is configured to change between the first communication method and the second communication method according to shooting modes.

10. A lens apparatus that can be attached to an imaging apparatus, comprising:
    contacts to which the imaging apparatus is electrically connected, and
    a control unit configured to change between a first communication method and a second communication method, and conduct communication processing with the imaging apparatus via the contacts,
    wherein, upon receipt, from the imaging apparatus, of information concerning a changeover request from the first communication method to the second communication method, the control unit conducts control so that communication by the second communication method is initiated after elapse of a transition time that is indicated by time information that is retained in advance, and
    wherein the first communication method includes a communication which synchronizes with a timing of an exposure processing of an imaging element, and the second communication method does not include the communication which synchronizes with a timing of an exposure processing of the imaging element.

11. The lens apparatus according to claim 10, wherein, upon changeover from the first communication method to the second communication method, the control unit conducts optical system control when receiving valid information in the first communication method before elapse of the transition time, after the information concerning the changeover request is received from the imaging apparatus.

12. The lens apparatus according to claim 10, wherein the control unit conducts communication processing with the imaging apparatus by cyclically repeating communication including a first communication and a second communication that follows the first communication in the first communication method.

13. The lens apparatus according to claim 12, wherein, upon changeover from the first communication method to the second communication method, the control unit receives information concerning a communication method changeover request from the imaging apparatus by the first communication.

14. The lens apparatus according to claim 12, wherein, after conducting the cyclical communication in the first communication method, the control unit conducts control so that the cyclical communication is initiated in synchronization with a next light exposure timing.

15. The lens apparatus according to claim 10, wherein, upon changeover from the first communication method to the second communication method, the control unit interrupts communication after receiving information concerning a communication method changeover request from the imaging apparatus.

16. The lens apparatus according to claim 10, wherein the first communication method is a communication method for a video shooting mode, and the second communication method is a communication method for a still-image shooting mode.

17. The lens apparatus according to claim 10, wherein, upon changeover from the second communication method to the first communication method, the communication unit conducts control so that communication is initiated in the first communication method after elapse of the transition time indicated by the time information.

18. The lens apparatus according to claim 10, wherein the control unit is configured to change between the first communication method and the second communication method according to shooting modes.

19. A control method executed by an imaging apparatus that can be equipped with a lens apparatus, comprising:

changing between a first communication method and a second communication method; and controlling, in a control step, communication processing with the lens apparatus via contacts to which the lens apparatus is electrically connected, wherein upon changeover from the first communication method to the second communication method, the control step further comprises;

transmitting, to the lens apparatus, information concerning a communication method changeover request; and initiating communication in the second communication method after elapse of a transition time indicated by time information retained in advance, and wherein the first communication method includes a communication which synchronizes with a timing of an exposure processing of an imaging element, and the second communication method does not include the communication which synchronizes with a timing of an exposure processing of the imaging element.

20. A control method executed by a lens apparatus that is attached to an imaging apparatus, comprising:

changing between a first communication method in the second communication method; and controlling, in a control step, communication processing with the imaging apparatus via contacts to which the imaging apparatus is electrically connected, wherein upon receipt, from the imaging apparatus, of information concerning a changeover request from the first communication method to the second communication method, the control step further comprises;

initiating communication in the second communication method after elapse of a transition time indicated by time information that is retained in advance, and wherein the first communication method includes a communication which synchronizes with a timing of an exposure processing of an imaging element, and the second communication method does not include the communication which synchronizes with a timing of an exposure processing of the imaging element.

* * * * *